US007809376B2

(12) United States Patent
Letourneau et al.

(10) Patent No.: US 7,809,376 B2
(45) Date of Patent: Oct. 5, 2010

(54) ENHANCED ANALOGUE OF INTERACTIVE VOICE RESPONSE STRUCTURES AND FUNCTIONS FOR MOBILE PHONES AND SIMILAR HANDHELD COMMUNICATIONS DEVICES

(75) Inventors: Gary Letourneau, Silver Spring, MD (US); Roberto Catalan, Silver Spring, MD (US)

(73) Assignee: Roberto S. Catalan, Rockville, MD (US)

( * ) Notice: Subject to any disclaimer, the term of this patent is extended or adjusted under 35 U.S.C. 154(b) by 1345 days.

(21) Appl. No.: 11/289,174

(22) Filed: Nov. 29, 2005

(65) Prior Publication Data

US 2007/0123223 A1    May 31, 2007

(51) Int. Cl.
    *H04M 11/10* (2006.01)
(52) U.S. Cl. .................... 455/445; 455/414.1; 455/418; 370/352; 379/201.04
(58) Field of Classification Search .................. 455/455, 455/414.1, 418; 379/201.04; 370/352
    See application file for complete search history.

(56) References Cited

U.S. PATENT DOCUMENTS

| 6,353,608 | B1 | 3/2002 | Cullers et al. |
|---|---|---|---|
| 6,404,880 | B1 | 6/2002 | Stevens |
| 6,456,699 | B1 | 9/2002 | Burg et al. |
| 6,587,822 | B2 | 7/2003 | Brown et al. |
| 6,631,186 | B1 | 10/2003 | Adams et al. |
| 6,745,021 | B1 | 6/2004 | Stevens |
| 6,788,770 | B1 | 9/2004 | Cook et al. |
| 6,823,370 | B1 | 11/2004 | Kredo et al. |
| 6,885,733 | B2 | 4/2005 | Pearson |
| 6,917,911 | B2 | 7/2005 | Schultz |
| 6,928,156 | B2 | 8/2005 | Book et al. |
| 2004/0192312 | A1* | 9/2004 | Li et al. ...................... 455/445 |
| 2005/0195954 | A1* | 9/2005 | Klein et al. ............ 379/201.04 |
| 2005/0201362 | A1* | 9/2005 | Klein et al. .................. 370/352 |
| 2005/0233733 | A1* | 10/2005 | Roundtree et al. ........ 455/414.1 |
| 2006/0072726 | A1* | 4/2006 | Klein et al. ............ 379/201.01 |

* cited by examiner

*Primary Examiner*—Danh C Le

(57) ABSTRACT

An integrated system and method that provides an enhanced analogue of interactive voice response structures and features for mobile phones and similar handheld communications devices, comprised of customized kernel applications, for communicating with central control servers and optional ancillary control servers with pertinent databases, auxiliary coordination applications on network-enabled computers, and an optional website that facilitates the creation of IVR-like structures and functions, via reference codes which are predominantly formatted as telephone numbers, to present a parallel, yet more powerful utilization of this widely-implemented and well-known voice-only construct, applied as an abbreviated Internet URL replacement in the typing-challenged mobile space, giving mobile devices access to VoIP-class features that also off-loads voice-only PABX platforms, without requiring IVR equipment or an infrastructure overhaul, by making full use of wireless and landline multi-protocol (i.e. TCP/IP) gateways, to provide easy and primarily visual access to wealth of organized content, with the ability to manipulate, send and receive specific, context and time sensitive multimedia information in a well-coordinated, controlled and scalable manner.

4 Claims, 12 Drawing Sheets gcIVRplus™ Website
User Registration

Custom Kernel Application Website Download — 512

Select the Model of Your Mobile Phone or Wireless Device: [Manufacturer] [Model]

Please enter your phone number: [Phone Number]

The kernel shall be sent to you as an SMS message upon completion of registration.

New User Registration

- Enter Unique Account Name: [ ]
- Enter Authentication Code: [ ]
- Confirm Account Name: [ ]
- Confirm Authentication Code: [ ]

General Display Mode — 540

- ☒ Combination Text and Graphics
- ☐ Text Only User Interface
- ☐ Graphical User Interface Only

Required User Details — 510

- First Name: [ ]
- Last Name: [ ]
- Valid Email Address: [ ]
- ZIP Code: [ ]
- Gender: [ ]
- Birthday: [ ]
- Registration Verification Code (Prevents automated registrations): [ ]

— 550

Select Default Server

- ☒ Use gcCentral Control Server by default
- ☐ Use Ancillary Control Server by default
- Enter IP Address or URL: [ ]

gcIVR display Mode — 560

- ☐ Visual Tree
- ☐ Pop-up List
- ☐ Drop-down List
- ☒ Combination of All

— 520

— 570

Optional Notification Preferences

- ☒ Notify me of fire, police, extreme weather or similar emergencies within one mile from my home address
- ☐ Notify me if event is within my ZIP Code
- ☐ Do not send me standard notifications

— 530

Optional Service Restrictions

- ☒ No Restrictions
- ☐ Audio Only (for the Blind)
- ☐ No Audio (for the Deaf)
- ☐ No Multimedia (improve speed)

FIG. 5A gcIVRplus™ Website
Designing YOUR gcIVRplus™ Structure and Functions

The following recursive questions will assist you in designing your gcIVRplus Structure and help you to assign Functions. The Structure that you create will be shown below the table. Be sure to complete the table. When you are done, press the F10 key to Save, then press the F8 key to verify and register with the Central Control Server. Thank you.

| How many Nodes under Source/Level? | | What is the Label for Source/Level? | Request or Locate Reference Code | Request or Locate Module Identification Code |
|---|---|---|---|---|
| Path | Answer | Answer | Answer Phone Number | BROWSE |
| A1 - Root | 3 | Client Services | 301.728.0000 | 01.A927B52 |
| A1/B1 | 2 | Payments | 301.728.0010 | 01.A927B53 |
| A1/B2 | 2 | Investments | 301.728.0020 | 01.A927B54 |
| A1/B3 | 3 | Inquiries | 301.728.0030 | |
| B1/C1 | 0 | Credit Card | 301.728.0040 | 01.A927B55 |
| B1/C2 | 0 | Mortgages | 301.728.0050 | 01.A927B56 |
| B2/C1 | 5 | Domestic | 301.728.0060 | 01.A927B87 |
| B2/C2 | 0 | Off-Shore | 301.728.0070 | 01.A927B89 |
| B3/C1 | 0 | Account Balances | 301.728.0180 | 01.A927B94 |
| B3/C2 | 0 | Credit Card | 301.728.0190 | 01.A927B95 |
| B3/C3 | 0 | Bank Statements | 301.728.0200 | 01.A927B96 |
| B2/C1/D1 | 0 | Real Estate | 301.728.0210 | 01.A927C57 |
| B2/C1/D2 | 0 | Mutual Funds | 301.728.0220 | 01.A927C58 |
| B2/C1/D3 | 0 | Stocks | 301.728.0230 | 01.A927C59 |
| B2/C1/D4 | 0 | Commodities | 301.728.0240 | 01.A927C60 |
| B2/C1/D5 | 0 | Bonds | 301.728.0250 | 01.A927C61 |

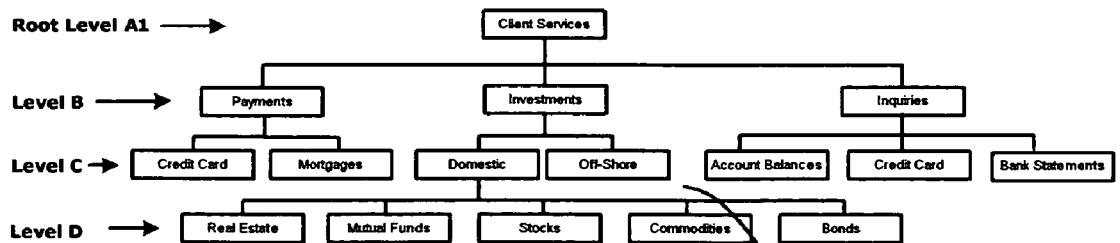

FIG. 5B

ENHANCED ANALOGUE OF INTERACTIVE VOICE RESPONSE STRUCTURES AND FUNCTIONS FOR MOBILE PHONES AND SIMILAR HANDHELD COMMUNICATIONS DEVICES

BACKGROUND

1. Field of Invention

This invention relates to an integrated system that provides an enhanced analogue of interactive voice response structures and functions (IVR) for mobile phones and similar devices. Despite the extensive deployment of these IVR systems in business establishments and organizations, there is a near universal level of frustration and outright disgust regarding the inefficiency and tediousness of using IVR and its related features.

All callers generally detest or simply do not have the time to listen through several minutes of a complex series of prerecorded verbal instructions, most especially if the caller only requires immediate and direct access to a particular party or information.

For example, when a blackout or water outage occurs in a county, several hundred people will usually call into the county's utilities management office to inquire as to what happened and when regular electrical or water service shall be restored. In such scenarios, all available telephone lines (and IVR functionality) will usually be jammed with hundreds of increasingly frustrated callers who require essentially the same set of information.

Caller frustration levels with IVR systems rise exponentially during medical emergencies, fire and other life-threatening disasters. There is clearly then a long-felt, long-existing and unsolved need to address well-known and rightly justified public frustration with IVR systems and its related features, since such efforts can directly result in not just added convenience, but also the preservation of life and property.

2. Description of Prior Art

There are known numerous systems that relate to the enhancement of wireless and landline communication functionality, including associated network elements, Internet interoperability, and automated user interfaces such as interactive voice response (IVR) devices that complement generally proprietary private automatic branch exchange (PABX) telephony equipment.

U.S. Pat. No. 6,928,156 discloses an automated operator assistance with menu options that allows a subscriber to implement and access telecommunications services, using a graphical user interface (GUI) via the Internet, but requires an IVR system to provide its services, whereas the present invention does not.

U.S. Pat. No. 6,917,911 discloses a IVR system that utilizes three levels of navigation with musical tones, for presenting information units arranged in sets, which is not implemented in the present invention.

U.S. Pat. No. 6,885,733 discloses a method for providing a user interface for audio telecommunication systems, whereas the present invention encompasses multimedia communications.

U.S. Pat. No. 6,823,370 discloses a system and method for retrieving select web content which collects desired search results and passes them to an IVR (Interactive Voice Response) system for presentation to the POTS/Cellular caller, that facilitates search request interpretation and Web searches by a trained operator, using a visual PC based browser, whereas the present invention is not mean for merely searching web content, neither does it require an IVR system to operate.

U.S. Pat. No. 6,745,021 discloses a system, controller and method for alerting mobile subscribers about emergency situations, whereas the present invention supports two-way communications and structures emergency communications into a context-sensitive data stream so that recipients are not flooded with unrelated information.

U.S. Pat. No. 6,788,770 discloses an 'intelligent' voice response (IVR) unit coupled to a public switched telephone network (PSTN) provides predetermined services to a user according to an IVR menu, whereas the present invention does not require IVR equipment, neither is its operation limited to PSTN, rather the present invention primarily operates in the realm of IP networks and provides access mainly using wireless mobile communications networks.

U.S. Pat. No. 6,631,186 discloses a system and method for implementing and accessing call forwarding services, whereas the present invention is not limited to call forwarding, neither is primary communication directed at IVR systems.

U.S. Pat. No. 6,587,822 discloses a web-based platform for interactive voice response (IVR) applications over the Internet and is primarily directed at a speech synthesizer, a grammar generator and a speech recognizer equipment, whereas the present invention is not primarily about the implementation of voice recognition technology.

U.S. Pat. No. 6,456,699 discloses a way for developing IVR menus using web-based applications, whereas the present invention is does not require IVR equipment and is not involved in any way in the creation of IVR menus.

U.S. Pat. No. 6,404,880 discloses a method and apparatus for delivering critical information that involves the use of IVR, PSTN networks and cellular phones and email, whereas the present invention is not limited to merely sending messages and is designed to provide context-sensitive information with two-way interaction.

U.S. Pat. No. 6,353,608 discloses a customer host connect gateway that connects any Interactive Voice Response (IVR) platform with any customer host computer, whereas the present invention functions independently of such IVR platforms.

OBJECTS AND ADVANTAGES

Several objects and advantages of the present invention are:

(a) to provide an enhanced analogue of interactive voice response structures and functions for mobile phones and similar handheld communications devices that enables a user to visually scan the entire or alternatively, only relevant portions of the enhanced IVR-like tree structure, based on the context of the reference code entered by the user;

(b) to provide an enhanced analogue of interactive voice response structures and functions for mobile phones and similar handheld communications devices that provides the ability for the user's cursor to be positioned directly within the enhanced IVR-like tree structure at the precise level required, based on the reference code entered, with the option to bookmark the position;

(c) to provide an enhanced analogue of interactive voice response structures and functions for mobile phones and similar handheld communications devices that enables a user to receive context-specific text, voice, video, graphical or multimedia data stream and a series of urgent alert messages, by using reference codes;

(d) to provide an enhanced analogue of interactive voice response structures and functions for mobile phones and similar handheld communications devices that significantly scales and improves the call capacity of standard PABX IVR systems cost effectively;

(e) to provide an enhanced analogue of interactive voice response structures and functions for mobile phones and similar handheld communications devices that enables people who do not have, or cannot afford to have IVR equipment to deploy enhanced IVR-like services and functionality;

(f) to provide an enhanced analogue of interactive voice response structures and functions for mobile phones and similar handheld communications devices that uses non-proprietary, open standards for messaging, so as to make messages immediately suitable for sharing, coordination and automated dissemination between a wide variety of systems;

(g) to provide an enhanced analogue of interactive voice response structures and functions for mobile phones and similar handheld communications devices that facilitates the creation of a cost-effective IVR-like interface for the deaf community; and (h) to provide an enhanced analogue of interactive voice response structures and functions for mobile phones and similar handheld communications devices that is more effective than websites in that it creates direct communications between parties while offering more ubiquitously accessible content, through a multitude of communication platforms.

Further objects and advantages shall become more apparent after considering the ensuing descriptions and drawings.

SUMMARY

The present invention solves a long felt frustration with the inefficiencies of existing IVR services, such as lack of direct access to information, a long list of puzzling options, redundant prompts or messages, unnecessary delays, etc., and addresses the long existing need to efficiently scale the limited number of connections, quickly traverse IVR structures and enhance the existing standard IVR functions by taking full advantage of the processing power and capabilities inherent to mobile phones and similar handheld communications devices.

Unlike prior art, the present invention provides an enhanced analogue of IVR structures and functions that encompasses the breadth of multimedia features long-promised by Voice over IP (VoIP) technology as an enhancement to proprietary PABX systems, and makes these unprecedented benefits immediately available to the majority of mobile handheld communications devices used today.

As a new and unexpected result, the aggregation of enhanced analogue of IVR structures for a multitude of entities, combined with an enriched set of multimedia functions made accessible over a variety of communications networks, creates a far more functional, content-rich, yet intuitive, easy to use digital 'yellow or white' pages, and establishes complementary, customized, ubiquitously available, two-way information portals on mobile handheld communications devices.

DRAWINGS

Drawing Figures

In the drawings, closely related figures have the same number but different alphabetic suffixes.

FIG. 1A shows the main elements that comprise the present invention, and the interaction between aforementioned elements.

FIG. 1B provides an overall view of how the main elements featured in FIG. 1A. interact with the Internet and the telecommunication companys' hardware infrastructure, to provide a more precise understanding of the present invention, where its elements are situated, and how it interoperates with other communication and information systems.

Figure 3A:
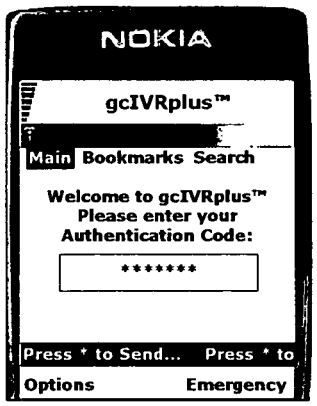
FIG. 3A shows the screen of a mobile device during startup, when the user is requested by the kernel application to enter his or her authentication code.
Figure 3B:
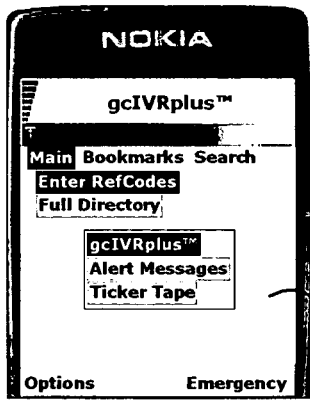
FIG. 3B shows the screen of a mobile device wherein the kernel application is displaying a drop down menu in the main information area.
Figure 3C:
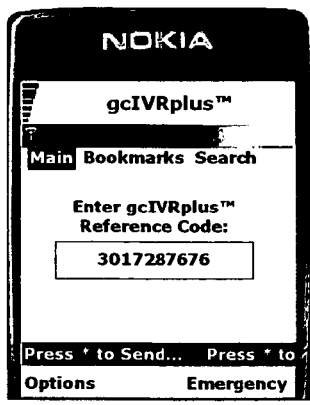
FIG. 3C shows the screen of a mobile device wherein the user is requested by the kernel application to enter a specific gcIVRplus reference code. It also shows the scrolling ticker tape providing information that changes according to the position of the users' cursor within the gcIVRplus structure.
Figure 3D:
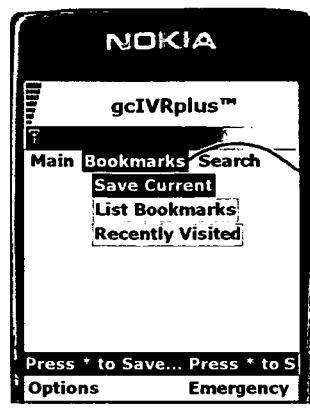
FIG. 3D shows the screen of a mobile device wherein the kernel application is displaying the drop down menu for the bookmarking of the current location of the user prompt on the gcIVRplus structure.
Figure 3E:
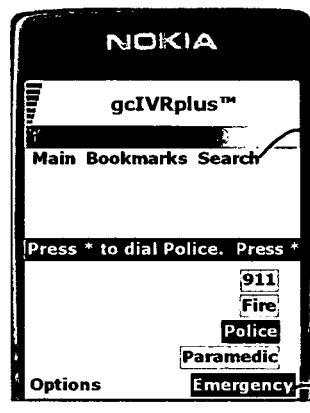
FIG. 3E shows the screen of a mobile device wherein the kernel application is displaying the 'drop-down' menu that facilitate contacting particular first responders during emergencies. It also shows how the location of the scrolling ticker tape position and content can change depending on the requirements of the entity registered within the gcIVRplus structure.
Figure 3F:
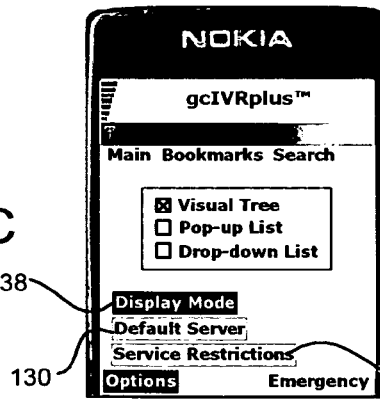

FIG. 3F shows the screen of a mobile device wherein the kernel application is displaying a check box menu to activate the users' preference with regard to how the gcIVRplus structure is presented. In this case, the display of all gcIVRplus structures shall take the form of a visual tree. Other user options are also displayed.

Figure 3G:
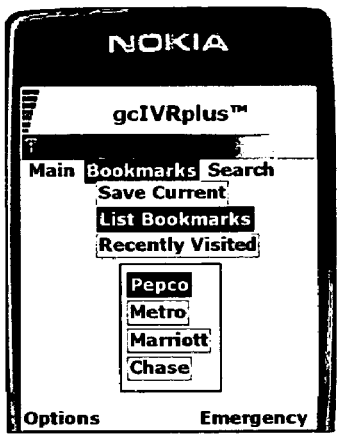

FIG. 3G shows the screen of a mobile device wherein the kernel application is displaying a drop-down menu that lists the users' bookmarks and activates a particular selection.

Figure 3J:
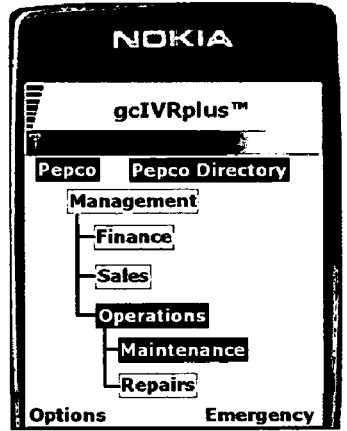
Figure 3H:
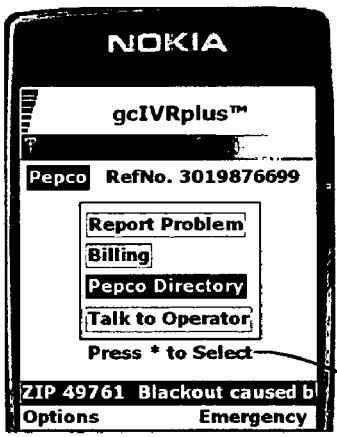

FIG. 3H shows the screen of a mobile device wherein the kernel application uses the saved gcIVRplus structure to allow the user to drill down and select a the full contact directory of a particular entity. It also shows how an independent broadcast message is received on the scrolling ticker tape.

Figure 3K:
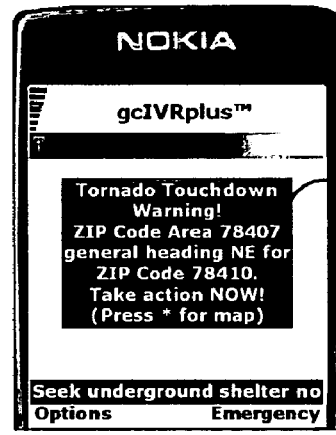
Figure 3I:
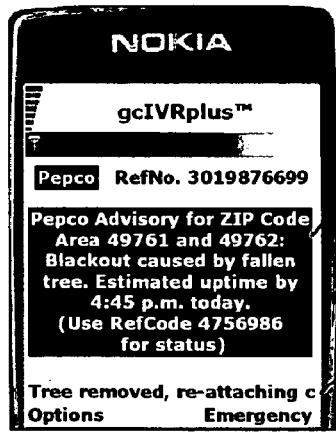

FIG. 3I shows the screen of a mobile device wherein the kernel application receives a notification message based on the ZIP Code entered by a registered user. The notification message also the instructions to change the reference code for the scrolling ticker tape to show updated status information on a particular event.

FIG. 3J shows the screen of a mobile device wherein the kernel application is displaying the gcIVRplus structure of a particular registered entity as a navigable visual tree as required by the user instruction from FIG. 3F.

FIG. 3K shows the screen of a mobile device wherein the kernel application is displaying a urgent notification message that is given the appropriate context by restricting recipients to registered users within the ZIP Codes affected by the event. This type of urgent notification message also causes the mobile device to activate a selected ringtone.

Figure 3L:
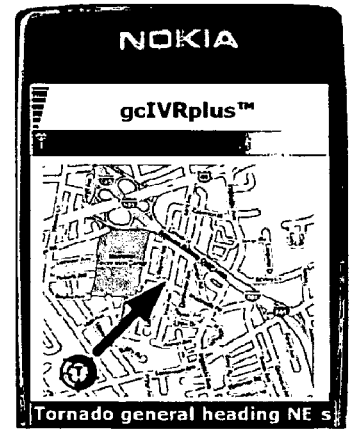

FIG. 3L shows the screen of a mobile device that displays a multimedia message as a result of the user selection from FIG. 3K. Notice how the scrolling ticker tape information takes over the last line of the usable screen of the mobile device to allow more content to be viewed.

Figure 4A:
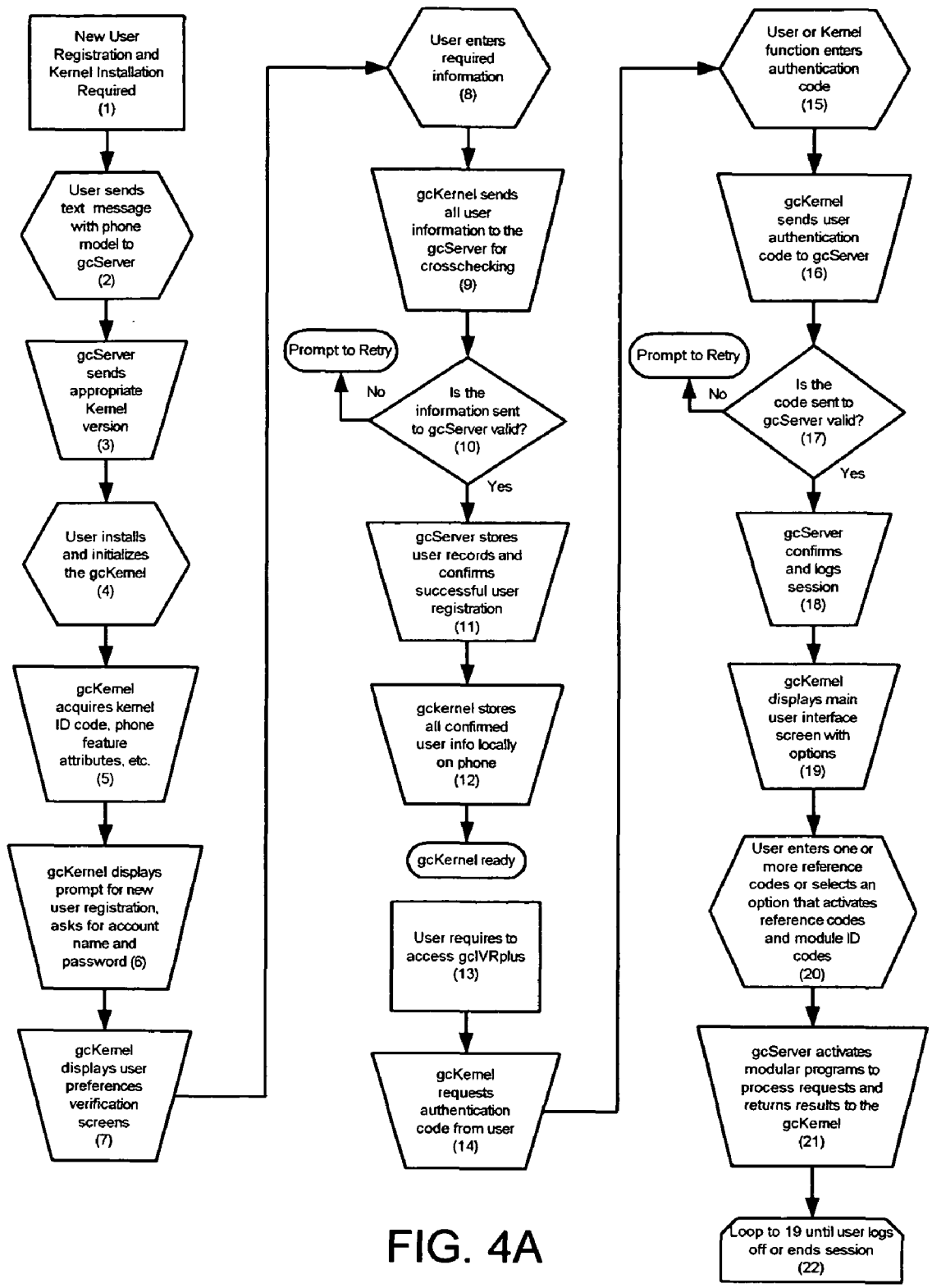

FIG. 4A shows a flowchart of the general interaction between the kernel application and the central control server during user registration and user operation.

FIG. 5A shows a sample user registration page from the commercial interactive website, wherein the user is prompted to encode required user and phone details and select display and notification preferences, service restrictions and default control server.

FIG. 5B shows the main webpage from the commercial interactive website for the creation of enhanced analogue IVR structure and functions by registered users, using a series of automated prompts. User answers dictate the depth and complexity of the structure, and shows the inter-relationship of each option with individual reference codes and module identification codes. The resulting database record created by the user by completing the resulting sectional table is displayed by the webpage as an organizational structure at the bottom of the screen.

Figure 5C:
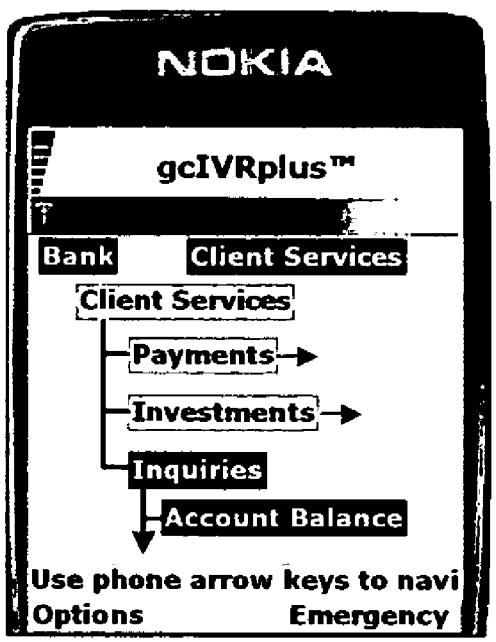

FIG. 5C shows the screen of a mobile device that displays a portion of the enhanced analogue IVR structure created in FIG. 5B, as the user scrolls down the list of options.

Figure 5D:
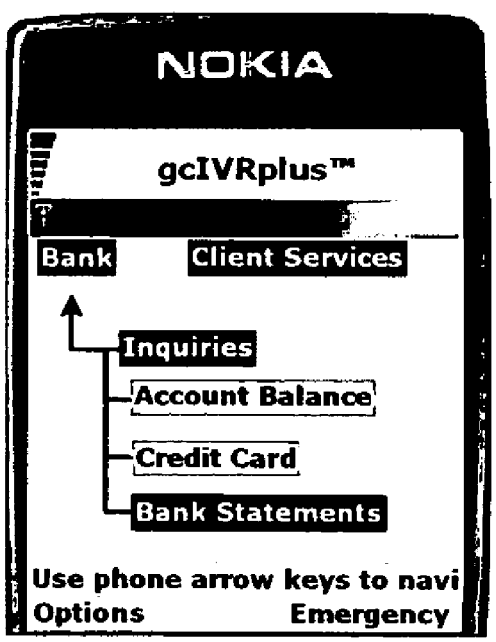

FIG. 5D shows the continuation of the mobile device screen shown in FIG. 5C wherein the rest of the enhanced analogue IVR structure created in FIG. 5B is displayed as the user scrolls down further.

REFERENCE NUMERALS IN DRAWINGS

100 Custom Kernel Applications
120 Kernel Identification Code
122 Subscriber Identification Module (SIM) Card Information
124 Phone Feature Attributes
126 Hardware Identification Codes
130 Default Control Server
132 Bookmarks and Recently Visited
134 Service Restrictions
136 Emergency Contacts
138 Structure Display Settings
140 Reference Code entry prompt
142 Full Directory
144 Search Facility
150 Main Information Area with Menus
152 Scrolling Ticker Tape
154 Notification Messages
156 Navigation Controls and Instructions
200 Central Control Server
210 Enhanced Analogue of IVR Structures Database
211 gcIVRplus Reference Codes assigned for each Enhanced Analogue of IVR Structure
212 Organizational Structure for Set of Options and Label for each Option
213 Reference Codes, Module Identification Codes and Content assigned to each Option
214 Kernel Display Commands during Navigation
220 User Registration Information Database
221 Username and Authentication Codes
222 User Details (i.e. Zip Code, Email, etc.)
223 User Notification Preferences
230 Reference Codes Database
231 gcIVRplus Reference Codes (on Central Control Server)
232 Alert Message Reference Codes
233 Scrolling Ticker Tape Reference Codes
234 Other Reference Codes
240 Modular Programs Database
241 Module Identification Codes
242 Modular Programs including Redirection Commands
250 Call and Message Routing Facility and Database
260 Session and Transaction Tracking and Call Record Details Database
270 Kernel Versions Database
280 Content Database
300 Auxiliary Coordination Application
310 Subset Groups from User Registration Database
312 Statically Recognized Authorities
314 Optional Dynamically Recognized Authorities
316 Target Groups
320 Local Reference Codes Database
322 gcIVRplus Reference Codes (on Auxiliaries)
324 Alert Message Reference Codes
326 Scrolling Ticker Tape Reference Codes
330 Call and Message Coordination Database
332 Database of Calls and Messages Received
334 Call and Message Processing Function
336 Call and Message Delivery Function
338 Call and Message Session and Transaction Tracking and Archiving
400 Ancillary Control Server
410 Local Enhanced Analogue of IVR Structures Database
411 Local gcIVRplus Reference Codes assigned for each Local Enhanced Analogue of IVR Structure
412 Organizational Structure for Set of Options and Label for each Option
413 Local Reference Codes, Module Identification Codes and Content assigned to each Option
414 Kernel Display Commands during Navigation
420 Local User Registration Information Database
421 Username and Authentication Codes
422 User Details (i.e. Zip Code, Email, etc.)
430 Local Reference Codes Database
431 gcIVRplus Reference Codes
432 Alert Message Reference Codes
433 Scrolling Ticker Tape Reference Codes
434 Other Reference Codes
440 Synchronized Local Modular Programs Database
441 Module Identification Codes
442 Modular Programs including Redirection Commands
450 Call and Message Routing Facility and Database
460 Session and Transaction Tracking and Archive Database
480 Local Application and Content Database
500 Commercial Interactive Website
510 Unique Account name and Authentication Code data entry area
512 Custom Kernel Application Website Download
520 Required User Details data entry area

530 Notification Preferences data entry area
540 General Display Mode selection checkbox
550 Default Server selection checkbox
560 Default Display Mode for gcIVRplus structures selection checkbox
570 Optional Service Restrictions selection checkbox
580 Main webpage for creating Enhanced Analogue of IVR Structures and Functions
590 Interactive Table of Structure Definition, Labels, Reference Codes and Module Identification Codes
592 Resulting Organization Structure defined in foregoing interactive table

DETAILED DESCRIPTION

Preferred Embodiment

Most mobile phones today have relatively powerful processors and are usually equipped with an embedded programming language such as JAVA or Python, which allows the phone to act like a miniature personal computer, capable of running a variety of customized programs.

Moreover, most of the newer phones released from 2003 up to the present generally have larger, color screens capable of displaying medium resolution graphics and video. Similarly, the memory capacity of these phones has substantially increased, and have been expanded further to multi-megabyte sizes with the inclusion of memory card slots.

Because of the efficiencies in manufacturing, many of the least expensive phones being introduced recently have JAVA or other embedded programming languages and medium resolution color screens by default.

Low-end mobile phones and similar handheld communication devices can still take advantage of the present invention via a WAP interface or through SMS messaging.

The creation of the programs will require a personal computer that runs an operating system such as Microsoft™ Windows2000™, XP™ or Red Hat™ Linux, and should be connected to the Internet.

It must be emphasized that simple, flat-file databases can be used in the present invention very effectively, most especially if the information is manageable or relatively static. The use of structured query language (SQL) database applications such as Oracle™ or Microsoft SQL Server™ are recommended however, especially because of the way the English language is used to form intuitive 'Select' command statements. In most circumstances, Microsoft Access™ or other less expensive, entry-level SQL-based database applications may suffice. Non-SQL databases can also be considered.

Sun Microsystems™ offers a free wireless development toolkit that can be downloaded from www.sun.com. This wireless toolkit from Sun supports J2ME, MIDP1 and MIDP2 kernel development.

We used the J2ME phone emulator from Nokia™ called Nokia Developer™, which is available at www.forumnokia.com, to create the programs. There are also emulators for MIDP1 and MIDP2 development from Samsung™, Sprint™, Motorola™, and other mobile phone manufacturers and telecommunications operators that can be used as an alternative.

We used custom batch scripts to accomplish conditional compiling of different kernels for different phones. The program for the backend servers was developed using Java servlets. As an alternative you can also use ASP™ or PHP™ to create these similar backend server programs.

You can also use J2ME Polish™ which incorporates XML-based conditional compilation. Apple™ Macintosh users can also develop Java programs using Apple JAVA tools. Alternatively, kernel applications can be built using Apple's Dashboard™ JAVA script technology. Developers for Qualcomm devices can use Brew™, C or C++ to create the required kernel applications.

For brevity, the terms gcIVRplus, gcKernel, gcServer shall refer to the enhanced analogue of IVR structures and functions, kernel applications and central control server respectively, as components of the present invention.

The detailed description to follow is further supported by the object code programs are contained in the accompanying compact disc to ensure that essential in-depth program details are fully disclosed. The program listing for these object codes are provided in the Appendix.

Each individual component used in the present invention solves a long-felt, long existing need by acting as a synergistic whole. The major components of the present invention are:
 I. Customized Kernel Applications for Mobile Phones and similar Handheld Communications Devices
 II. Central Control Servers
 III. Auxiliary Coordination Applications on Network-enabled Computers
 IV. Optional Ancillary Control Servers
 V. Commercial Interactive Website

I. Kernel Applications for Mobile Phones and Similar Handheld Communications Devices The following description relates to FIGS. 1A, 2A, 3A to 3L and 5A. The custom kernel applications 100 main task is to provide the primary user interface for communicating with either the central control server 200 or the ancillary control server 400 from which the kernel ultimately acquires the information or applications which the user requests. The kernel application 100 is created in a variety of versions, customized for specific models of mobile handheld communications devices. Aside from communication duties, the kernel application generally has four other major functions: session identification, device display, presenting standard user options and saving user preferences.

Under session identification function, each custom kernel application 100 is assigned a unique kernel identification code 120, which is used to identify and segregate a particular users' device from the multitude of other people and devices using the system. Further distinction for the same purpose and a variety of other useful features can be gained if the subscriber information module (SIM) card information 122, global positioning system (GPS) and the device hardware identification number 126 can be accessed.

Under the main user options function, the kernel application 100 provides the user with the ability to enter reference codes 140 as shown in FIG. 3C. Reference codes are predominantly real-world, existing phone numbers. Within the context of the present invention, these phone numbers link the mobile communications device user to a wealth of structured information and context sensitive notifications. Other user options included in the kernel application 100 is the presentation of the complete list of publicly accessible enhanced analogue of IVR structures, essentially a full directory 142 and a search facility 144 for locating specific items within it.

The custom kernel application 100 collects the feature attributes 124 of the device and makes this information accessible to other programs. This allows other applications to make full use for example, of the mobile devices' particular screen size. With this information, the kernel application 100 provides a main information area with menus 150, a scrolling ticker tape 152 that displays messages requested via the aforementioned reference codes, occasional notification messages 154 and navigational controls and instructions 156, as shown in FIGS. 3H and 3I.

For convenience, the kernel application allows the user to save his or her preferences, such as specifying the default control server 130, which can either be the central control server 200 or an ancillary control server 400 that is licensed to a particular business entity or organization by specifying an IP address, URL or a modular program for redirection. The user can also save bookmarks and recently visited 132 locations, as shown in FIG. 3G. The user can save service restrictions 134 such as audio only, no text for the blind, no audio for the deaf, no multimedia and no video to improve response times. Standard emergency contacts 136, i.e. paramedic, police, fire, etc. can likewise be stored by the user. The user can also choose structure display settings 138 to show either a visual tree, pop-ups or dropdown lists whenever an gcIVRplus structure is displayed on screen, as shown on FIG. 3F.

II. Central Control Server

The following description relates to FIGS. 1A, 2A, 2B, 3F, 4A, 5A and 5B. The central control server 200 is the keystone of the present invention. It coordinates the activities between all custom kernel applications 100, ancillary control servers 400, auxiliary coordination applications 300 and the commercial interactive website 500.

The central control server 200 contains a database of enhanced analogues of IVR structures 210. In this database, each record for a particular entity can be visualized as a table of information similar to the sectional table shown in FIG. 5B. This table defines the required organizational structure of nodes or options and a label for each option 212. The database assigns a gcIVRplus reference code 211 for each record, however each of the options within the record itself can contain module identification codes, other reference codes and content assigned to each option 213. The database also contains kernel display commands 214 for each option within a record, for changing what is displayed on the mobile device screen as each option is traversed.

The central control server also contains a database of information about registered users 220. This contains the account name and the authentication code assigned to each user 221, the user details such as user name, ZIP code, address, etc. 222 and each users' notification preferences 223. This information is built up directly into the database by authorized staff or alternatively, from registered user input on the phone, similar to that shown in FIG. 3F or through a website, as shown in FIG. 5A.

Each user record is then paired with the information gathered from the custom kernel application 100 such as the kernel identification code 120, subscriber identification module (SIM) card information 122 and hardware identification codes 126 to establish the uniqueness of each session or transaction in the system provided by the present invention. Phone feature attributes 124 are also included for each user record to allow various applications to run correctly on a particular users' mobile device.

To ensure the integrity and consistency of information, the central control server 200 maintains a database of reference codes 230 which contains gcIVRplus reference codes 231 for the enhanced analogue of IVR structures, alert message reference codes 232, scrolling ticker tape information 233 and other reference codes 234.

gcIVRplus reference codes 231 may be actual trunkline numbers used by a particular business entity. In the present invention, these reference numbers are used in a similar manner as an website addresses or universal resource locators (URLs) are used on the Internet, albeit on mobile communications devices instead of workstations.

In the preferred embodiment, any valid reference code 234 (such as an extension number) within the gcIVRplus structure can summon a pertinent section of the gcIVRplus structure 212 and locate the user in the appropriate location within the same structure.

Similarly, the central control server 200 maintains a modular programs database 240, which is comprised of module identification codes 241, modular programs 242 that include short redirection commands to external application servers and external content. There is a certification and acceptance process prior to the inclusion of any program within the modular programs database 240, and more importantly before the module identification codes 241 are assigned and made available to registered users.

The central control server 200 directs the flow of information as required by registered users running a multitude of modular programs and external applications, typically via established connectivity to a multimedia communications network. The central control server 200 has a call and message database and routing facility 250 for distributing this information using varied criteria from authorized users.

Other databases that comprise the central control servers' functions are the session and transaction tracking and archive database 260, a database containing various versions of customized kernel applications 270 and a database for often-used content 280.

III. Auxiliary Coordination Applications On Network-Enabled Computers

Figure 1A:
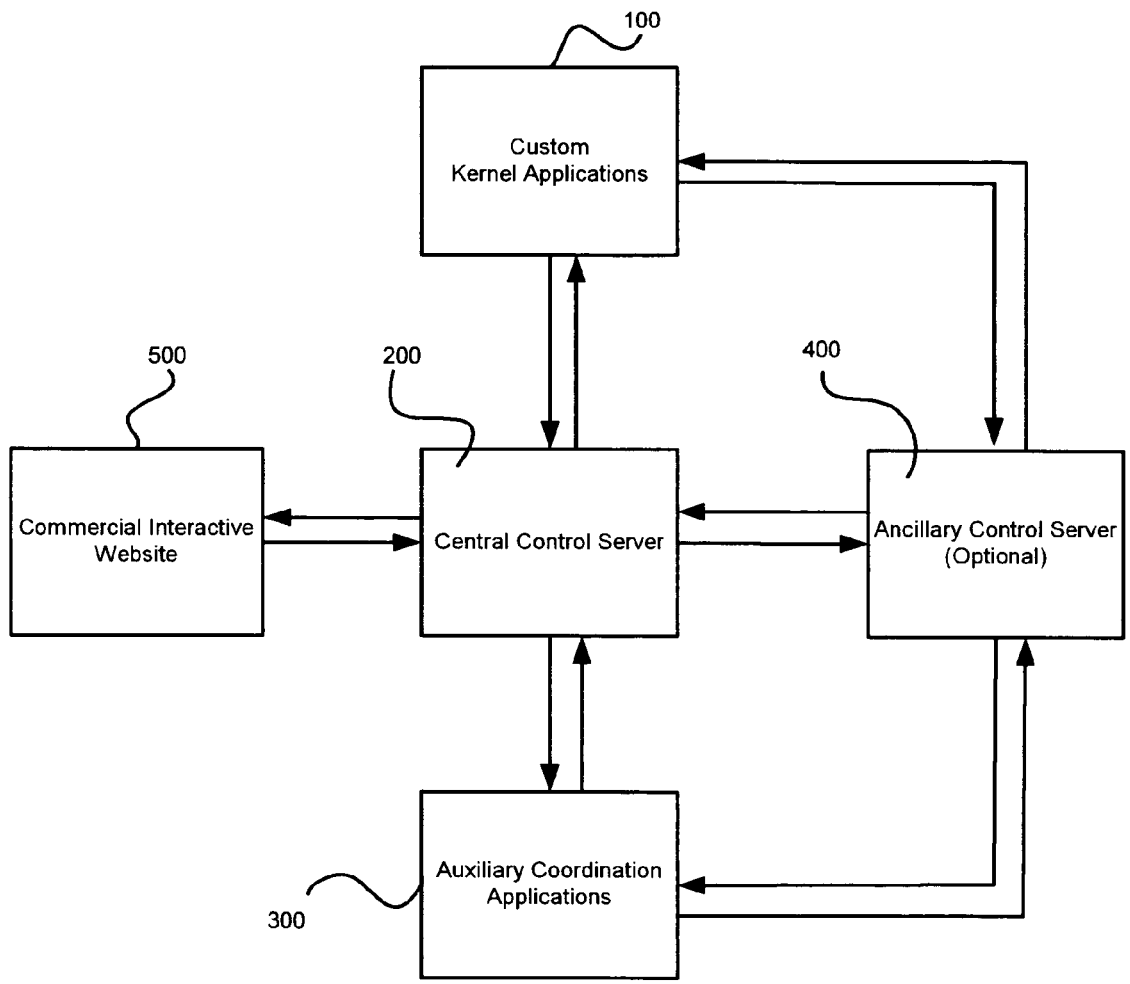
Figure 1B:
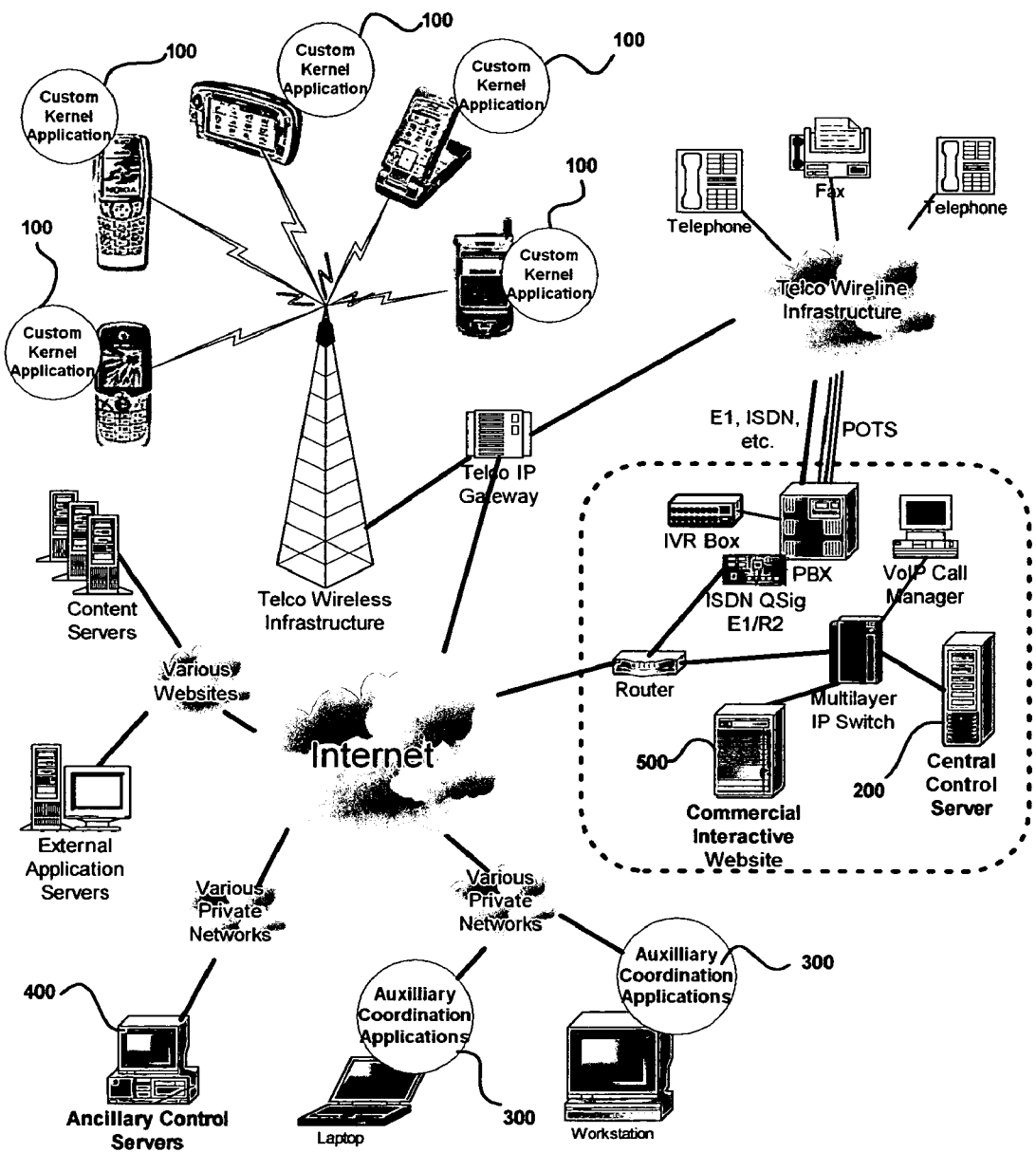
Figure 2A:
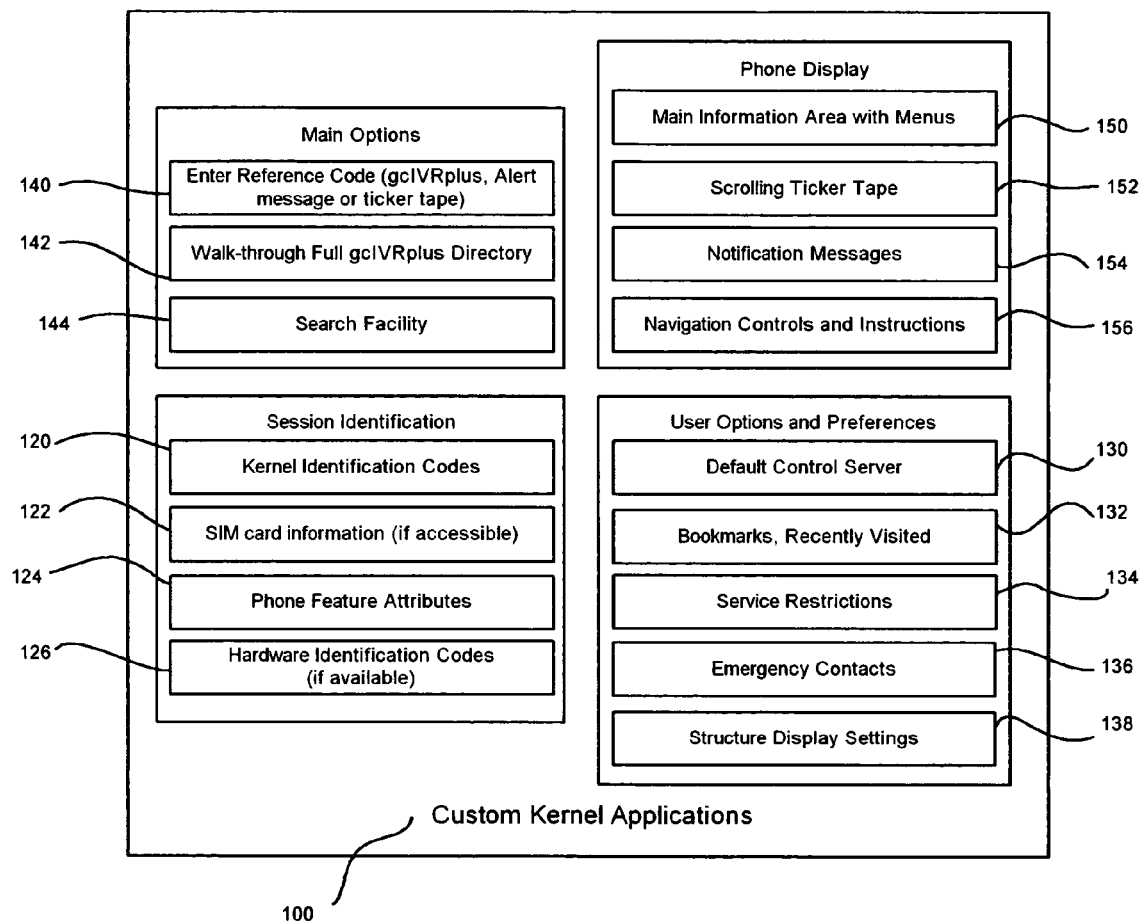
FIG. 2A shows the elements and features that comprise the custom kernel application, to provide the reader with a more in-depth understanding of FIG. 1A and FIG. 1B.
Figure 2B:
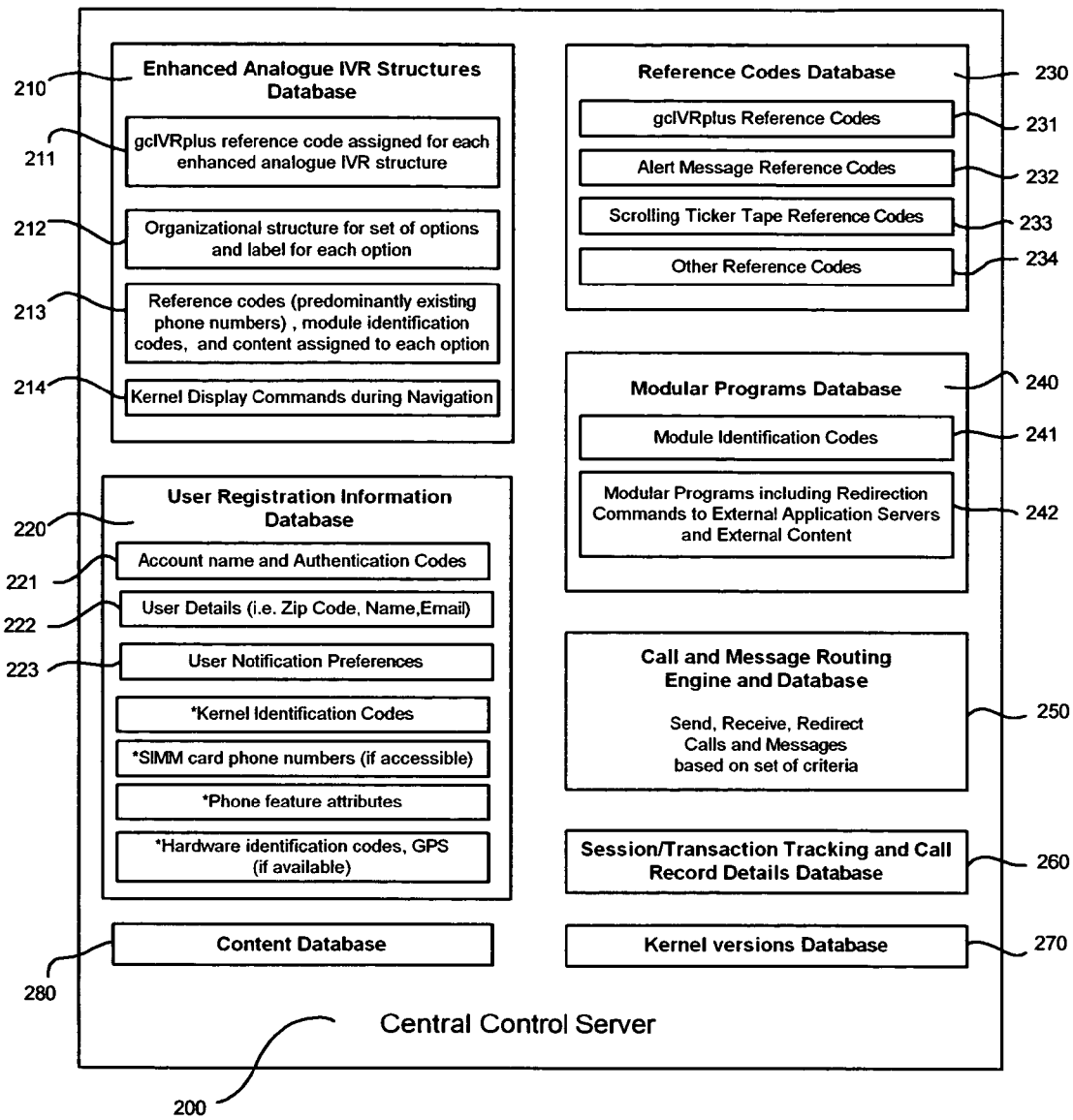
FIG. 2B shows the elements and features that comprise the central control server, to provide the reader with a more in-depth understanding of FIG. 1A and FIG. 1B.
Figure 2C:
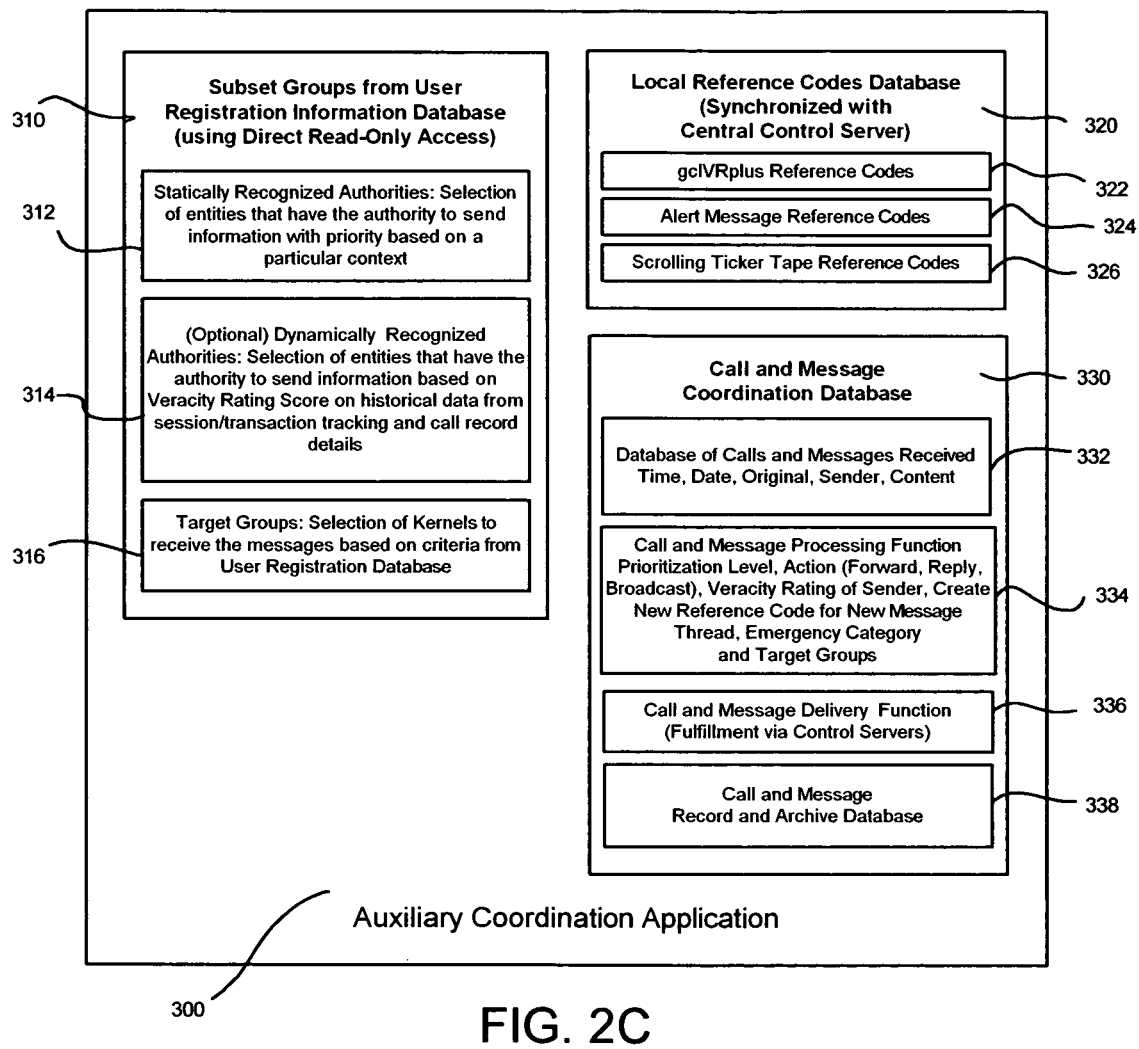
FIG. 2C shows the elements and features that comprise the auxiliary coordination application, to provide the reader with a more in-depth understanding of FIG. 1A and FIG. 1B.

The following description relates to FIGS. 1A, 2B and 2C. The present invention allows easy, intuitive access to a wealth of information using mobile devices. There is a need however to ensure that information coming from these same mobile devices are attended to in an efficient and systematic manner. This is provided by auxiliary coordination applications 300. The auxiliary coordination application 300 is generally authorized to have read-only access into the user registration information database 220 on the central control server 200.

This allows the operator of the application to automate the delivery and receipt of information by creating subset groups 310 to organize how data is received and sent. For example, a static set of recognized authorities 312 can be created for organizations such as government emergency management agencies, police, county utilities offices and weather bureaus. Urgent or emergency messages from these statically recognized authorities can thus be distributed to all kernel applications 100 contained in the user registration information database 220 that indicates that the users' ZIP code is within an area affected by the particular emergency.

The auxiliary coordination application 300 also provides a way of creating target groups 316, which is essentially a selection of kernels from the user registration information database 220 that shall receive particular messages based on a predetermined set of criteria.

A database of local reference codes 320 can be created by using the auxiliary coordination application 300, but these must be synchronized with the central control server 200 to ensure the integrity of all reference codes used in the present invention. The auxiliary coordination application 300 provides the capability to perform more in-depth coordination of an event by offering a narrower subset of reference codes for gcIVRplus structures 322, alert messages 324 and scrolling ticker tape information 326 to create datastreams, messages and an emergency response communications infrastructure with a more precise context.

The auxiliary coordination application 300 has a call and message coordination database 330 which is comprised of calls and messages received 332, the call and message processing function 334 which specifies the action to be taken on a particular call or message and the target group of recipients and the message delivery facility 336 that pushes these calls or messages out to the central control server 300 or the ancillary control servers 400 as necessary. Likewise included is a database for the recording and archiving of calls and messages 338 sent through the auxiliary coordination application 300.

Oftentimes there is a need to evaluate the veracity of urgent calls or messages from people or organizations who are not included in the statically recognized authorities 312 list. Thus an optional, dynamically-created set of recognized authorities 314 is created by rating the accuracy of each call or message attributed to a user, in the context of an event assigned to a specific reference code 322, and the average of these ratings is joined to a subset of records from the user registration information database 220 and a similar subset of records from the call and message coordination database 330. For example, a frequent caller is a local tornado chaser and most of the messages sent by the person proved to be accurate. That persons' veracity rating in the user registration information database 220 in the context of weather-related emergencies is high, thus if a message is received from that person about another tornado, his message gets priority over hundreds of other queued messages awaiting delivery.

IV. Optional Ancillary Control Servers

Figure 2D:
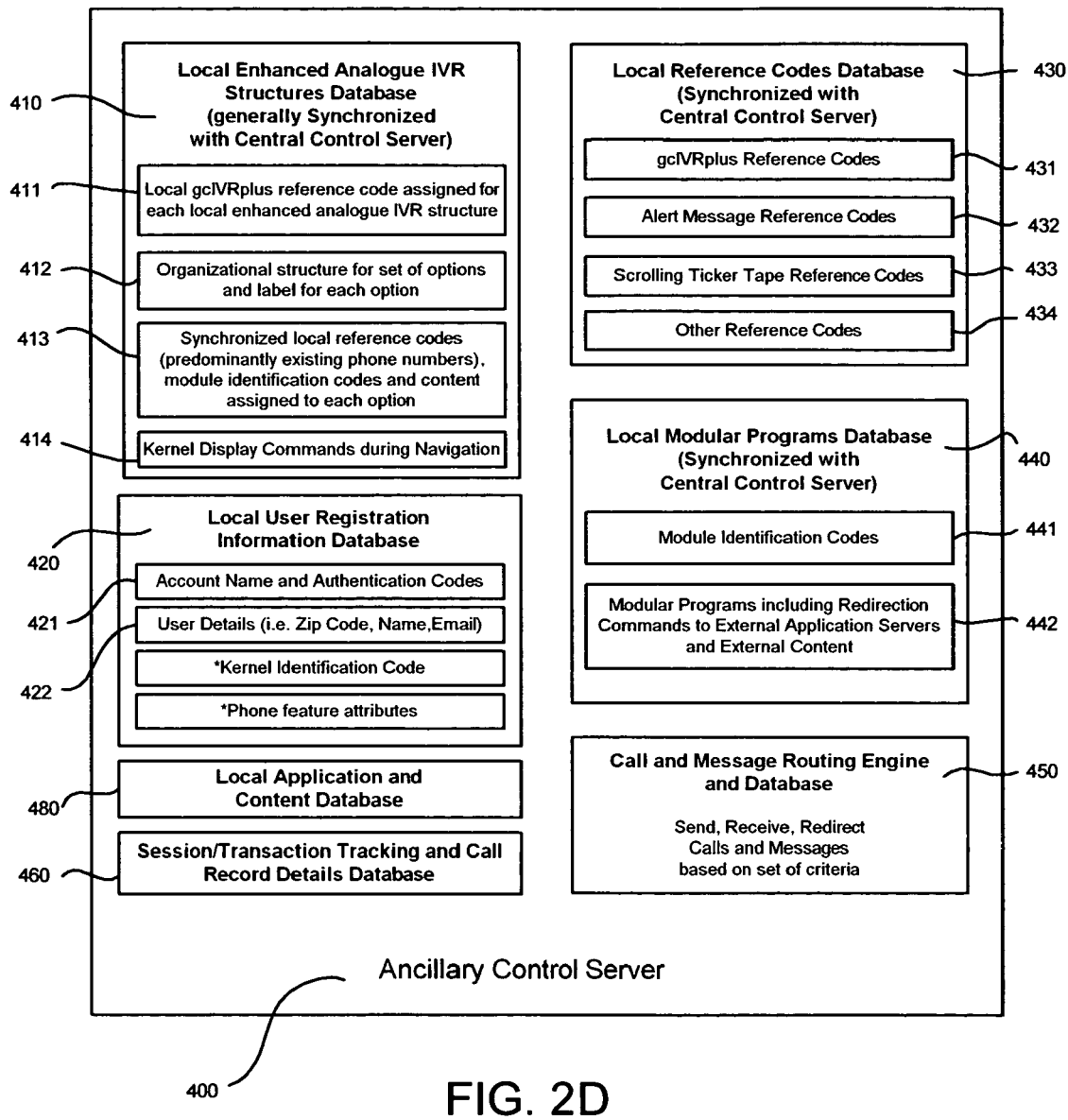
FIG. 2D shows the elements and features that comprise the ancillary control server, to provide the reader with a more in-depth understanding of FIG. 1A and FIG. 1B.

The following description relates to FIG. 1A and FIG. 2D. It may be necessary for a particular entity to require its own control server, most especially when the size and depth of an organization or the number of transactions involved is massive enough to warrant a dedicated service.

Thus the features of an ancillary control server 400 is nearly identical to that of the central coordination server 200, however the difference lies mainly in that all reference codes 230 and all modular programs 240 must be certified by the central control server 200 and thus unique throughout the present invention.

The ancillary control server 400 contains a database of locally-created enhanced analogues of IVR structures 410. Each record for a particular entity in this database can be visualized as a table of information similar to the sectional table shown in FIG. 5B. This table defines the required organizational structure of nodes or options and a label for each option 412. The database assigns a local gcIVRplus reference code 411 for each record, however each of the options within the record itself can contain module identification codes, other local reference codes and content assigned to each option 413. The database also contains kernel display commands 414 for each option within a record, for changing what is displayed on the mobile device screen as each option is traversed.

The ancillary control server also contains a local user registration database 420. This contains the account name and the authentication code assigned to each local user 421 and the user details such as user name, ZIP code, address, etc. 422. This information is built up directly into the database by authorized staff or alternatively, from registered user input on the phone, similar to that shown in FIG. 3F or through a website, as shown in FIG. 5A.

Each user record is then paired with the information gathered from the custom kernel application 100 such as the kernel identification code 120 to establish the uniqueness of each session or transaction in the system provided by the present invention. Phone feature attributes 124 are also included for each user record to allow various applications to run correctly on a particular users' mobile device.

To ensure the integrity and consistency of information, the ancillary control server synchronizes with the central control server 200 with regard to the database of all locally-created reference codes 430. This database is comprised of local reference codes for gcIVRplus structures 431, local alert messages 432, local scrolling ticker tape information 433 and other locally-created reference codes 434.

Similarly, the ancillary control server 400 maintains a local modular programs database 440 that is synchronized with the central control server 200. This is comprised of local module identification codes 441, local modular programs including short redirection instructions to external application servers and external content 442.

The ancillary control server 400 likewise directs the flow of information as required by locally registered users running a multitude of local modular programs 442 and external applications, typically via established connectivity to a multimedia communications network. The ancillary control server 400 also has a call and message database and routing facility 450 for distributing this information using varied criteria.

Other databases that comprise the ancillary control servers' functionality are the session and transaction tracking and archive database 460 and a database for often-used content 480.

V. Commercial Interactive Website

We recommend the use of Macromedia Dreamweaver™ to create webpages however, the reader may prefer other software packages like Microsoft Frontpage™. Website hosting service companies like Lunarpages.com™ or IPowerWeb.com™ can assist the reader to setup a new website easily without need for intensive technical training, because the setup procedures are clear and the technical support is readily available. Moreover, these companies provide in-house services and applications for setting up webservers and connecting their clients' databases directly to webpages for an additional fee. These premium webhosting services is highly recommended because the webhosting company knows what operating systems and applications would work best with their particular infrastructure setup. When it comes to hardware it is best not to guess, to avoid headaches.

The following description relates to FIGS. 1A, 1B, 2B and 5A to 5D. In the typical circumstance wherein an organization or a group of people require IVR-like functionality but do not have, or cannot afford such equipment, the present invention provides a cost-effective way to quickly rollout enhanced analogue of IVR functions by harnessing the Internet.

The commercial interactive website 500 serves secondary interface for new users into the user registration information database 220, and the primary public interface for creating detailed and personalized enhanced analogue of IVR structures 210.

As shown in FIG. 5A, the commercial interactive website 500 user registration is generally comprised of data entry areas for the selection of the users' mobile device model for custom kernel application downloading 512, new unique account name and authentication code 510 and required user details 520. In addition there are generally several selection checkboxes, such as for notification preferences 530, for selection of general display mode 540, for the identification of a default server 550, selection of a default display mode for gcIVRplus structures 560, and for establishing optional service restrictions 570.

The commercial interactive website allows the creation of detailed and personalized enhanced analogue of IVR structures 210, without the assistance of a programmer. This is done via the presentation of a series of user input webpage prompts as shown in FIG. 5B.

Likewise shown in FIG. 5B, the main webpage for creating enhanced analogues of IVR structures and functions 580 is comprised of an interactive sectional table of structure definitions, labels, reference codes and module identification codes 590 and a diagram showing the resulting organizational structure 592 created by the user. FIGS. 5C and 5D show how the sample structure created in the commercial interactive website 500 would appear on the kernel application 100 of a mobile communications device.

Alternative Embodiments

An alternative embodiment of the present invention involves the creation of custom kernel applications that can be run on personal computers. For example, with Java™ Webstart™ loaded onto the computer running on a Windows XP™ platform, a personal computer (PC) version of the kernel application 100 can replicate its enhanced analogue of IVR functions over the Internet using a voice over IP gateway plus an interface to the telcos' wireless infrastructure.

Another alternative embodiment is the use of multiple ZIP Codes. This can be used to define for example a users' office location whereby the condition for event notification is expanded to include any emergency situation happening on major thoroughfares between the users' home ZIP Code and the users' office ZIP Code.

Likewise, given the authorization by a governing entity to use existing emergency 911 capabilities for determining the location of multiple mobile phones via cellsite registration, triangulation or Global Positioning System features, the present invention can be used to expand or filter call or message receipt and notification to a more precise geographical area to maximize its effectiveness.

ADVANTAGES

IVR was meant to automate an assist communications but it instead it has created a frustrating maze for the majority of its users. People cannot remember verbally-created structures and multiple nested steps with consistent accuracy. The flow of instructions in IVR is usually too fast for nearly anyone to make a definite decision before other options are spoken, adding even more difficulty and resulting in inevitable confusion. The option to repeat the verbal instructions is oftentimes not provided, and this results in having to repeatedly redial the same contact number to traverse the same perplexing IVR structure several anger-provoking times. The users' distress is further aggravated by the fact that the unnecessarily lengthy phone call is usually done over an expensive, metered service.

Because our visual cognitive abilities far exceeds our auditory abilities, a predominantly visual method of traversing an enhanced IVR-like menu via a ubiquitously available communications device is invaluable for increasing both the financial and practical effectiveness and efficiency of necessary, day-to-day human interaction with automated systems.

More importantly, the present invention exploits the well-established, well-ingrained construct of telephone numbers and harnesses it to provide an succinct alternative to lengthy Internet addresses or URLs, making a wealth of information readily accessible and expanding the functionality of mobile devices even further. It can be argued that the present invention immediately brings to the general public and the mobile communications industry nearly all the technological promises of Voice over IP technology without the need to overhaul any existing infrastructure.

OPERATION

The following description relates to FIGS. 1A, 2A, 2B, 3A to 3L and 4A.

The mobile communications device-based user registration process into the system begins when the user sends a text message with the model of the phone to a phone number used specifically for registration of new users.

The user then receives from the central control server 200 an SMS message with the appropriate kernel application 100. After the user installs and initializes the kernel application 100, the kernel application 100 then acquires the kernel identification code 120, the subscriber identification module (SIM) card information 122 and global positioning system (GPS) information if it is accessible, various phone feature attributes 124, and accessible hardware identification codes 126 for the first time.

The kernel application 100 then displays a screen prompt for an account name and authentication code 221. Upon data entry by the user, the kernel application quickly verifies the information with the central control server 200. Since both account name and authentication code 221 do not yet exist in the user registration information database 220, the kernel application 100 then prompts the user if registration is desired. If the user reply is affirmative, the kernel application 100 then prompts for user details 222 and user notification preferences 223.

Once the user has completed the required information, the kernel application 100 then sends all user and mobile device information to the central control server 200 for cross-checking. If all information sent is valid, the central control server 200 then stores the received user and mobile device information and confirms to the kernel application 100 that the user has successfully registered.

The kernel application 100 then notifies the user that the registration was successful, stores the user and mobile device information onto the non-volatile memory of mobile communications device, and awaits the users' next action.

After the kernel application 100 is loaded onto the mobile device it generally appears on the phone's application page as one of the options. Upon selection, the kernel application 100 then requests the user to enter the authentication code 221, as shown in FIG. 3A, if the user is not yet on-line.

The kernel application 100 then contacts 'default' control server 130 defined on the mobile device, which verifies if the user is authorized to use the system. If authentication is successful, the registered users' kernel identification code 120, optional hardware identification codes 126 are recorded and a new session between the kernel application 100 and the default control server 130 is established.

On the mobile device, the main information area 150, scrolling ticker tape 152, occasional notification messages 154, navigation controls and instructions, 156, and options are then displayed. As shown in FIG. 3B, the main menu options generally include the option to directly enter a reference codes 140 or to display the full gcIVRplus directory 142.

If the user enters a ticker tape reference code 233, the message on the scrolling ticker tape 152 shall change depending on the context of the data stream requested by the user. This is shown in FIG. 3I, and it should be noted that if the user presses a phone navigation key, the context of the scrolling ticker tape 152 shall change and display information required for navigation or display information about a particular menu option wherever the cursor is currently located. After the user stops pressing the phone navigation key, the data displayed on the scrolling ticker tape 152 shall revert to the context of the previously requested ticker tape reference code 233.

After several days of frequent operation of the present invention, the user would have built up a list of bookmarks 132 similar to that shown in FIG. 3G. The user would then selected a particular option and would proceed to drill down the selected options' gcIVRplus structure 212, similar to that shown in FIG. 3H, and so forth and so on until the users' intended task is accomplished.

As a particular option is selected by a user it can activate the display of notification messages 154 on the mobile device, because the user is assumed to be in the context wherein the message is relevant and acceptable to the user. This is shown in FIG. 3I.

In contrast, a user can receive without making any request, emergency notifications messages 154 complete with warning ringtones, based on the context of information within the user registration information database 220 or some other criteria. An example of this situation is shown in FIG. 3K, wherein a tornado has been sighted in the same ZIP Code as that of a registered user. Under these circumstances, the emergency notification message 154 shall likewise change the information on the scrolling ticker tape 152 to display instructions or updates regarding the emergency. The user can also access multimedia information tied into the emergency notification message 154, such as a map regarding the general heading of the tornado, as shown in FIG. 3L.

In contrast, when a new user is registered via the commercial interactive website 500, the user is first instructed to select the model of the mobile device and enter the contact number for that mobile device 512.

The user is then instructed to fill out data entry prompts for account name, authentication code 510, and user details 520 including user preferences such as for notifications 530, general display mode 540, default server 550, gcIVRplus structure display mode 560 and optional service restrictions 570, as shown in FIG. 5A.

Once data entry is completed, the information is sent by the commercial interactive website 500 to the central control server 200 for cross-checking. If the data sent is in order, the central control server 200 shall confirm the fact to the user on the website connection and sends the appropriate version of the kernel application 100 as an SMS message to the users' mobile device.

The user then receives from the central control server 200 the SMS message containing the appropriate kernel application 100. After the user installs and initializes the kernel application 100, the kernel application 100 then acquires the kernel identification code 120, the subscriber identification module (SIM) information 122 and global positioning system information if it is available, various phone feature attributes 124, and accessible hardware identification codes 126 for the first time.

The kernel application 100 then displays a screen prompt for an account name and authentication code 221. Upon data entry by the user, the kernel application quickly verifies the information with the central control server 200. Since both account name and authentication code 221 have been pre-registered on the commercial interactive website 500, the kernel application 100 then notifies the user that the registration was successful, stores the user and mobile device information onto the non-volatile memory of mobile communications device, and awaits the users' next action.

The definition of IVR functions on a standard PABX telephony system is generally a manual process involving an expert, usually a reseller of the PABX and a staff member of the business establishment who knows the IVR requirements. In a similar manner, the creation of individual records in the enhanced analogue of IVR structures database 210, especially for complex implementations will likewise require the involvement of an expert.

For less complex implementations, the commercial interactive website 500 provides a way to scale the required expertise and provide a publicly available, computer-assisted interface for creating detailed and personalized records in the enhanced analogue of IVR structures database 210.

The following operational examples pertain to FIG. 5B. A registered user logs into the commercial interactive website to access the main webpage for creating enhanced analogue of IVR structures and functions 580. The user is then prompted to create the structure by encoding answers to a series of questions. The user is first asked to assign a label to the root or topmost level—level A1, of the interactive table of structure definition, labels, reference codes and module identification codes 590.

The user is then asked to define the number of nodes or options that will appear under the root option. In the example, the label supplied by the user for the root option is 'Client Services' and the number of options beneath it on Level B as '3'. The webpage then automatically appends three lines representing the three nodes or options and generates the path, which is essentially the combination of source nodes and levels, to identify each node or option.

The webpage then recursively asks the user for labels for each of the three nodes or options and the number of nodes or options beneath each one. In the example, node A1/B1 on level B, the first option under the root is given a label by the user of 'Payments', and the number of nodes beneath this 'Payments' option is defined to be 2. Node A1/B2 on level B is given a label of 'Investments' and the number of nodes beneath it is defined to be 2. For node A1/B3 on level B, the label assigned is 'Inquiries' and the number of nodes beneath it as 3.

At this point, beneath the interactive table of structure definition, labels, reference codes and module identification codes 590, a resulting organizational structure defined in the foregoing interactive table 592 takes shape as a inverted tree structure. Level C nodes or options are displayed without labels.

Again the webpage queries the user for labels for the level C nodes or options. In the example the user replies the label for B1/C1 to be 'Credit Card' and the number of nodes or options to be zero. Node B1/C2 is given the label 'Mortgages' and the number of nodes or options is again zero. For node B2/C1 the label given by the user is 'Domestic', and the number of nodes or options beneath it on Level D is 5. Node B2/C2 is given a label of 'Off-shore' and the number of nodes or options beneath it is zero. For node B3/C1, the label supplied by the user is 'Account Balances' and the number of nodes beneath it is zero. Node B3/C2 is given the label of 'Credit Card' and the number of options beneath it is likewise zero. For the node B3/C3 the label supplied is 'Bank Statements' and the number of options or nodes beneath it is again zero.

The webpage continues to ask the for labels and number of nodes or options beneath recursively until the all node quantities are defined as zero, essentially the last or leaf option in that branch. The webpage asks the table definition for nodes B2/C1/D1 to D5. The user replies with the following labels: B2/C1/D1-'Real Estate', B2/C1/D2-'Mutual Funds', B2/C1/D3-'Stocks', B2/C1/D4-'Commodities' and B2/C1/D5-'Bonds', and defines the number of nodes or options beneath them to be all zero.

While the resulting organizational structure defined in the foregoing interactive table 592 is visibly complete, there are still essential missing elements which the user must still define in the interactive table of structure 590 and that is the reference codes 234 and module identification codes 241 assigned to each option.

The user then assigns to each node or option reference codes 234, which are predominantly existing telephone numbers or trunk lines that would generally be assigned to a person, item or organization under standard IVR on a PABX telephony system. In this way, these phone numbers have dual functions in the standard telephony space and in the context of enhanced functionality under the present invention.

Module identification codes 241 are then assigned by the user to each node or option, normally by browsing through a list from the central control servers' 200 modular programs database 240. The modular programs 242 tied to each module identification codes 241 define the processing to be done, the content to be accessed and the results to be returned to the kernel application 100.

In the example shown on FIG. 5B, once the table is completed, and the user is satisfied with the structural design and functional definitions, the user is then instructed by the webpage to save the interactive table of structure definition, labels, reference codes and module identification codes 590 by pressing the F10 function key. The user is then instructed by the webpage application to press the F8 function key to verify and register the record with the central control server 200.

The central control server 200 then checks the information from the table and ensures the uniqueness of reference codes 234 and module identification codes 241 assigned in the structure. If all of the information sent is validated by the central control server 200, a record is created in the enhanced analogue of IVR structures database 210.

The registered user can then make full use of this newly created enhanced analogue of IVR structures and functions. For example, under FIG. 5B, if the user selects option B3/C2 Inquiries—Credit Card from the kernel application 100 on the users' mobile communications device, a multimedia program can be run to provide the user with audio visual information on due dates, payments due, transaction listings, charges incurred and the like.

CONCLUSION, RAMIFICATIONS AND SCOPE

Accordingly, the reader will see that the present invention provides for the creation of enhanced IVR-like structures and functions for mobile phones and similar handheld communications devices, by using reference codes which are predominantly formatted as telephone numbers, thereby presenting a parallel, yet more powerful utilization of this widely-implemented and well-known voice-only construct, which is applied as an abbreviated Internet URL replacement in the typing-challenged mobile space.

In so doing, the present invention provides mobile devices with access to advanced Voice over IP (VoIP)-class features, which can likewise simultaneously off-load and improve the efficiency of proprietary voice-only PABX telephony and IVR platforms, without needing the such equipment to operate nor require an overhaul of existing communications infrastructure.

The present invention makes maximum use of wireless and landline multi-protocol (i.e. TCP/IP Internet Protocol) gateways, to provide easy and primarily visual access to wealth of organized content, with the ability to manipulate, send and receive specific, context and time sensitive multimedia information in a well-coordinated, controlled and scalable manner.

While the above description contains many specificities, these should not be construed as limitations on the scope of the invention, but rather as an exemplification of one preferred embodiment thereof. Accordingly, the scope of the invention should be determined not by the embodiments illustrated, but by the appended claims and their legal equivalents.

Program Listing

The program object codes for the present invention are herewith submitted in two identical compact discs labeled 'Enhanced Analogue: Letourneau Catalan'. There are two parts in the program listing. Part 'A', is the mapping of index codes against file names in the compact disc, and Part 'B' is the mapping of the reference numerals and descriptions against index codes of related object files.

Part A: Table of Contents
  I. Directories:
   1.) MIDP—contains compiled versions
   2.) VERSIONS—contains compiled versions
  II. Index Code and File Name

| | |
|---|---|
| A. | CDS.class |
| B. | CDSComp.class |
| C. | CDSH.class |
| D. | CONSTANTS.class |
| E. | LANG.class |
| F. | ListPanel.class |
| G. | MagPanel.class |
| H. | Main.class |
| I. | MenuBar.class |
| J. | MenuItems.class |
| K. | NewsPanel.class |
| L. | OptionsScr.class |
| N. | ServerQuery.class |
| O. | SplashScr.class |
| P. | TablePanel.class |
| Q. | TickerPanel.class |
| R. | header.java |
| S. | code.java |
| T. | config.txt |
| U. | graphics176.png |
| V. | graphics176.txt |
| W. | AddCounter.class |
| X. | CDStats.class |
| Y. | DataCounter.class |
| Z. | GetDataSP.class |
| AA. | JAD.jad |
| AB | JAR.jar |
| AD. | QuestionPanel.class |
| AE. | AdGame.class |
| AF. | RSSPanel.class |
| AG. | IVRData.class |
| AH. | ivrweatherjsp.java |
| AI. | GetMessage.txt |
| AJ. | Messager.java |
| AK. | MessagePanel.class |
| AL. | PushMsg.java |
| AM. | ivrpush.jad |

Part B: Mapping Reference Numerals and Description Against Index Codes of Related Object Files

| Reference Numerals and Description | Index Codes of Related Object Files |
|---|---|
| 100 Custom Kernel Applications | A-Z, AA, AB, AD-AF, AI-AM |
| 120 Kernel Identification Code | C, H, R, S-T, AG |
| 122 Subscriber Identification Module (SIM) Card Information | C, H, S |
| 124 Phone Feature Attributes | C, H, S |
| 126 Hardware Identification Codes | C, H, S |
| 130 Default Control Server | Z, AG |
| 132 Bookmarks and Recently Visited | C, H, AG |
| 134 Service Restrictions | C, H, R, S, T, AG |
| 136 Emergency Contacts | C, H, AG |
| 138 Structure Display Settings | C, H |
| 140 Reference Code entry prompt | C, H, O |
| 142 Full Directory | C, F, H |
| 144 Search Facility | C, H, N, Z |
| 150 Main Information Area with Menus | H, I, J, L |
| 152 Scrolling Ticker Tape | Q |
| 154 Notification Messages | C, Q, AK, AL, AM |
| 156 Navigation Controls and Instructions | H, L, Q |
| 200 Central Control Server | N, Z, AG |
| 210 Enhanced Analogue of IVR Structures Database | N, Z, AG |
| 211 Reference Codes assigned to each record | C, H, AG, AL, AM |
| 212 Organizational Structure for Set of Options and Label for each Option | F |
| 213 Reference Codes, Module Identification Codes and Content assigned for each Enhanced Analogue of IVR Structure | R, T, N, Z, AG |
| 214 Kernel Display Commands during Navigation | R, T, N, Z, AG |
| 220 User Registration Information Database | N, Z, AG |
| 221 Username and Authentication Codes | R, T, N, Z, AG |
| 222 User Details (i.e. Zip Code, Email, etc.) | N, Z, AG, AL, AM |
| 223 User Notification Preferences | N, Z, AG |
| 230 Reference Codes Database | N, Z, AG |
| 231 gcIVR Reference Codes | R, T, N, Z, AG |
| 232 Alert Message Reference Codes | R, T, N, Z, AG |
| 233 Scrolling Ticker Tape Reference Codes | R, T, N, Z, AG |
| 234 Other Reference Codes | R, T, N, Z, AG |
| 240 Modular Programs Database | N, Z, AG |
| 241 Module Identification Codes | R, T, N, Z, AG |
| 242 Modular Programs including Redirection Commands | B, F, G, K, P, Q, AD, AE, AF, AK |
| 250 Call and Message Routing Facility and Database | N, Z, AG |
| 260 Session and Transaction Tracking and Call Record Details Database | N, Z, AG, W, X, Y |
| 270 Kernel Versions Database | A-Z, AA, AB, AG |
| 280 Content Database | N, Z |
| 300 Auxiliary Coordination Application | N, Z |
| 310 Subset Groups from User Registration Database | N, Z, AG |
| 312 Statically Recognized Authorities | R, T, N, Z, AG |
| 314 Optional Dynamically Recognized Authorities | R, T, N, Z, AG |
| 316 Target Groups | AG |
| 320 Local Reference Codes Database | N, Z, AG |
| 322 gcIVR Reference Codes | R, T, N, Z, AG |
| 324 Alert Message Reference Codes | R, T, N, Z, AG |
| 326 Scrolling Ticker Tape Reference Codes | R, T, N, Z, AG |
| 330 Call and Message Coordination System | N, Z, AG, AL, AM |
| 332 Database of Calls and Messages Received | N, Z, AG, AL, AM |
| 334 Call and Message Processing Function | N, Z, AG, AL, AM |
| 336 Call and Message Delivery Function | N, Z, AG, AL, AM |
| 338 Call and Message Session and Transaction Tracking and Archiving | N, Z, AG, AL, AM, W, X, Y |
| 400 Ancillary Control Server | N, Z |
| 410 Local Enhanced Analogue of IVR Structures Database | N, Z, AG |
| 411 Local gcIVRplus Reference Codes assigned for each Local Enhanced Analogue of IVR Structure | N, Z, , AG, AL, AM |
| 412 Organizational Structure for Set of Options and Label for each Option | R, T, N, Z |
| 413 Local Reference Codes, Module Identification Codes and Content assigned to each Option | R, T, N, Z, AG |
| 414 Kernel Display Commands during Navigation | R, T, N, Z, AG |
| 420 Local User Registration Information Database | N, Z, AG |
| 421 Username and Authentication Codes | R, T, N, Z, AG |
| 422 User Details (i.e. Zip Code, Email, etc.) | N, Z, AG, AL, AM |
| 430 Local Reference Codes Database | N, Z, AG |
| 431 gcIVR Reference Codes | R, T, N, Z, AG |
| 432 Alert Message Reference Codes | R, T, N, Z, AG |
| 433 Scrolling Ticker Tape Reference Codes | R, T, N, Z, AG |
| 434 Other Reference Codes | R, T, N, Z, AG |
| 440 Local Modular Programs Database | N, Z, AG |
| 441 Module Identification Codes | R, T, N, Z, AG |
| 442 Modular Programs including Redirection Commands | B, F, G, K, P, Q, AD, AE, AF, AK, N, Z |
| 450 Call and Message Routing Engine and Database | N, Z, AG, AL, AM |
| 460 Session and Transaction Tracking and Archive Database | N, Z, AG, AL, AM, W, X, Y |
| 480 Local Application and Content Database | N, Z |
| 500 Commercial Interactive Website | AH, AG |
| 510 Unique Account name and Authentication Code data entry area | AG |
| 512 Custom Kernel Application Website Download | AG |
| 520 Required User Details data entry area | AG |
| 530 Notification Preferences data entr area | AG |
| 540 General Display Mode selection checkbox | AG |
| 550 Default Server selection checkbox | AG |
| 560 Default Display Mode for gcIVRplus structures selection checkbox | AG |
| 570 Optional Service Restrictions selection checkbox | AG |
| 580 Main webpage for creating Enhanced Analogue of IVR Structures and Functions | AG |
| 590 Interactive Table of Structure Definition Labels, Reference Codes and Modular Program Codes | AG |
| 592 Resulting Organization Structure defined in foregoing interactive table | AG |

We claim:

1. An integrated system that provides an enhanced analogue of interactive voice response system structures and functions for mobile phones and similar handheld communications devices, comprising:

(a) a plurality of customized kernel applications for mobile phones and similar handheld communication devices which will:

(1) uniquely identify, and optionally locate, said mobile phones and similar handheld communications devices, to establish distinct sessions and transactions with one or more predetermined control servers by collecting kernel application identification codes, predetermined feature attributes, and when accessible, unique hardware identification codes, subscriber identification module card information, and global positioning system information from said mobile phones and similar handheld communication devices, (2) provide a user interface, generally formatted according to said predetermined feature attributes, for saving user preferences such as bookmarks and structure display settings, activating a search facility, summoning a directory, and other related tasks, (3) enable a user or automated program to enter one or more reference codes that are predominantly comprised of phone numbers, and optional authentication codes which are transmitted to one or more said predetermined control servers over a communications network, (4) request, receive and display a predetermined set of options analogous to interactive voice response services, context-specific data streams as scrolling ticker tape messages, and urgent notification messages, from said predetermined control servers, generally accessed via said reference codes, (5) initialize predetermined modular programs, each one identified by a module identification code associated with each option, within said predetermined set of options, as required by said user or automated program, (6) provide said user or automated program with the facility to send dynamically created or pre-formatted messages, and respond to each said urgent notification messages or said scrolling ticker-tape messages, (7) access through predetermined communication networks, traditional voice and multimedia services, including applications and information from one or more predetermined external application and content servers, as required by said modular programs, and (8) optionally store for added efficiency, said predetermined set of options, said modular programs, a selection of said reference codes, said external applications, and pertinent information onto said mobile phones and similar handheld communication devices, should said feature attributes indicate adequate capability, (b) one or more central control servers which will:

(1) provide access, storage, management and manipulation of a database of user registration information, including user device information comprised of said kernel application identification codes, said predetermined feature attributes, said unique hardware identification codes, said subscriber identification module card information, and said global positioning system information from said mobile phones and similar handheld communication devices, for session identification, verification and transaction tracking, (2) provide access, storage, management, and manipulation of a database of structure definitions, labels, said reference codes, said module identification codes, and other programs and information that form analogous interactive voice response services, (3) provide access, storage, management, and manipulation of databases for said reference codes, said modular programs including said module identification codes assigned to each said modular programs, and content, (4) serve as a default resource and registry for said kernel applications, substantially regarding access to said modular programs, including redirection to said external applications and external content servers, (5) provide gateway connectivity to the public Internet and to one or more telephone companys' wireless and landline infrastructure, (6) interface and coordinate with predetermined communications systems, other control servers and workstations as required by said modular programs and said databases, and (7) provide a call and message routing facility and database for sending, receiving and forwarding calls, text, voice, graphical or multimedia messages and notifications to predetermined communications systems, voice and messaging servers, and other network-enabled devices, generally based on said reference codes, predetermined user registration parameters and a predetermined set of specific kernel identification codes, (c) one or more optional ancillary control servers which will:

(1) provide a predetermined set of kernel identification codes access, storage, management and manipulation of a local database of user registration information, including local user device information comprised of said kernel application identification codes, said predetermined feature attributes, etc. for local session identification, verification and transaction tracking, (2) provide said predetermined set of kernel identification codes access, storage, management and manipulation of a local database of structure definitions, labels, said reference codes, said module identification codes, and other programs and information that form local analogous interactive voice response services, each record of which is registered with said central control servers, (3) provide said predetermined set of kernel identification codes access, storage, management, and manipulation of databases for local reference codes, local modular programs, and local content, all of which must be registered with said central control servers, (4) serve as a primary resource and registry for a predetermined set of kernel identification codes, substantially regarding access to said local modular programs, including redirection to said external applications and external content servers, (5) provide local gateway connectivity to the public Internet and to various telephone companys' wireless and landline infrastructure, (6) interface and coordinate with predetermined communications systems and workstations as required by said local modular programs and said databases, and (7) provide said predetermined set of kernel identification codes with a local call and message routing facility and database for sending, receiving and forwarding calls, text, voice, graphical or multimedia messages and notifications to predetermined communications systems, voice and messaging servers, and other network-enabled devices, generally based on said local reference codes and said user registration parameters.

2. An integrated system for organizing a multitude of emergency calls and similar time-sensitive messages to assist in the coordination of responses by a plurality of participating entities, comprising:

(a) the integrated system of claim 1, further including a plurality of auxiliary coordination applications on network-enabled computers assigned to authorized people and organizations which will:

(1) interface with said central control servers and said ancillary control servers, (2) provide access, storage, management, and manipulation of a database of manually-selected recognized authorities derived as a subset group from said user registration information database for prioritization of call or message delivery and receipt, based on context generally derived from a specific reference code, (3) provide access, storage, management, and manipulation of a database of dynamically-created recognized authorities derived as a subset group from predetermined information from said user registration information database and archived calls and messages, for prioritization of the delivery and receipt of active calls or messages, based on context generally derived from a specific reference code, (4) create target groups by classifying registered people and organizations generally based on predetermined aspects of said user registration information, and said kernel identification codes, (5) aggregate, group and sort active calls and messages, generally based on particular reference codes, prioritization assigned to said manually-selected or dynamically-created recognized authorities and said target groups, (6) optionally reclassify and reassign predetermined calls and messages to other locally-created reference codes registered with said central control server, for creating said context-specific data streams, and said urgent notification messages, (7) send or forward calls and message to one or more said central control servers or said ancillary control servers for delivery to said predetermined kernel identification codes based on said target groups, and (8) record, close and archive inactive calls, messages, sessions and transactions.

3. A method for providing an enhanced analogue of interactive voice response system structures and functions on mobile phones and similar handheld communications devices, comprising:

(a) a plurality of customized kernel applications for mobile phones and similar handheld communication devices which will:

(1) identifying uniquely, and optionally locating, said mobile phones and similar handheld communications devices, to establish distinct sessions and transactions with one or more predetermined control servers by collecting kernel application identification codes, predetermined feature attributes, and when accessible, unique hardware identification codes, subscriber identification module card information, and global positioning system information from said mobile phones and similar handheld communication devices, (2) providing a user interface, generally formatted according to said predetermined feature attributes, for saving user preferences such as bookmarks and structure display settings, activating a search facility, summoning a directory, and other related tasks, (3) enabling a user or automated program to enter one or more reference codes that are predominantly comprised of phone numbers, and optional authentication codes which are transmitted to one or more said predetermined control servers over a communications network, (4) requesting, receiving and displaying a predetermined set of options analogous to interactive voice response services, context-specific data streams as scrolling ticker tape messages, and urgent notification messages, from said predetermined control servers, generally accessed via said reference codes, (5) initializing predetermined modular programs, each one identified by a module identification code associated with each option, within said predetermined set of options, as required by said user or automated program, (6) providing said user or automated program with the facility to send dynamically created or pre-formatted messages, and respond to each said urgent notification messages or said scrolling ticker-tape messages, (7) accessing through predetermined communication networks, traditional voice and multimedia services, including applications and information from one or more predetermined external application and content servers, as required by said modular programs, and (8) storing as an option for added efficiency, said predetermined set of options, said modular programs, a selection of said reference codes, said external applications, and pertinent information onto said mobile phones and similar handheld communication devices, should said feature attributes indicate adequate capability, (b) one or more central control servers which will:

(1) providing access, storage, management and manipulation of a database of user registration information, including user device information comprised of said kernel application identification codes, said predetermined feature attributes, said unique hardware identification codes, said subscriber identification module card information, and said global positioning system information from said mobile phones and similar handheld communication devices, for session identification, verification and transaction tracking, (2) providing access, storage, management, and manipulation of a database of structure definitions, labels, said reference codes, said module identification codes, and other programs and information that form analogous interactive voice response services, (3) providing access, storage, management, and manipulation of databases for said reference codes, said modular programs including said module identification codes assigned to each said modular programs, and content, (4) serving as a default resource and registry for said kernel applications, substantially regarding access to said modular programs, including redirection to said external applications and external content servers, (5) providing gateway connectivity to the public Internet and to one or more telephone companys' wireless and landline infrastructure, (6) interfacing and coordinating with predetermined communications systems, other control servers and workstations as required by said modular programs and said databases, and (7) providing a call and message routing facility and database for sending, receiving and forwarding calls, text, voice, graphical or multimedia messages and notifications to predetermined communications systems, voice and messaging servers, and other network-enabled devices, generally based on said reference codes, predetermined user registration parameters and a predetermined set of specific kernel identification codes, (c) one or more optional ancillary control servers which will:
- (1) providing a predetermined set of kernel identification codes access, storage, management and manipulation of a local database of user registration information, including local user device information comprised of said kernel application identification codes, said predetermined feature attributes, etc. for local session identification, verification and transaction tracking,
- (2) providing said predetermined set of kernel identification codes access, storage, management and manipulation of a local database of structure definitions, labels, said reference codes, said module identification codes, and other programs and information that form local analogous interactive voice response services, each record of which is registered with said central control servers,
- (3) providing said predetermined set of kernel identification codes access, storage, management, and manipulation of databases for local reference codes, local modular programs, and local content, all of which must be registered with said central control servers,
- (4) serving as a primary resource and registry for a predetermined set of kernel identification codes, substantially regarding access to said local modular programs, including redirection to said external applications and external content servers,
- (5) providing local gateway connectivity to the public Internet and to various telephone companys' wireless and landline infrastructure,
- (6) interfacing and coordinating with predetermined communications systems and workstations as required by said local modular programs and said databases, and
- (7) providing said predetermined set of kernel identification codes with a local call and message routing facility and database for sending, receiving and forwarding calls, text, voice, graphical or multimedia messages and notifications to predetermined communications systems, voice and messaging servers, and other network-enabled devices, generally based on said local reference codes and said user registration parameters.

4. A business method to allow individuals, groups and organizations who may not have an interactive voice response (IVR) equipment to create, personalize and access an enhanced analogue of said interactive voice response system structures and functions on mobile phones and similar handheld communications devices, comprising:
- (a) the method of claim 3, further including a commercial interactive website, which will:
  - (1) providing a web-based interface into said central control server for selecting and downloading said custom kernel applications to said mobile phones and similar handheld communications devices via user-supplied contact numbers,
  - (2) providing said web-based interface into said central control server for registering new users and collecting required user details, identifying user preferences and areas of interest or concern, for automated receipt of context-based calls and messages, said urgent notifications and said context-based data-streams, and
  - (3) providing said web-based interface into said central control server for facilitating the creation and management of an interactive table of said structure definitions, said labels, said reference codes, said module identification codes, and other programs and information that form analogous interactive voice response (IVR) services, based on responses from registered users.

* * * * *